UNITED STATES PATENT OFFICE.

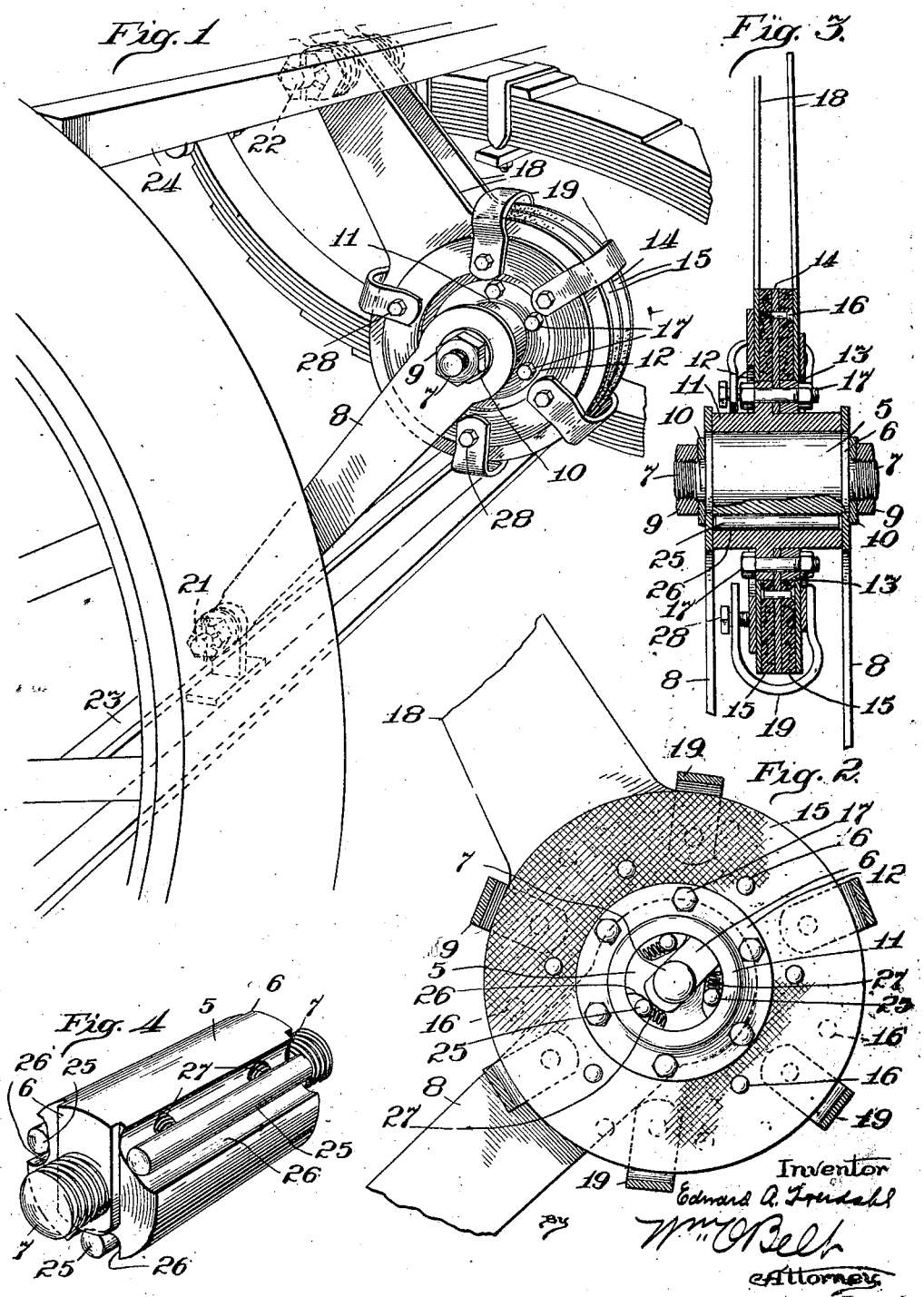

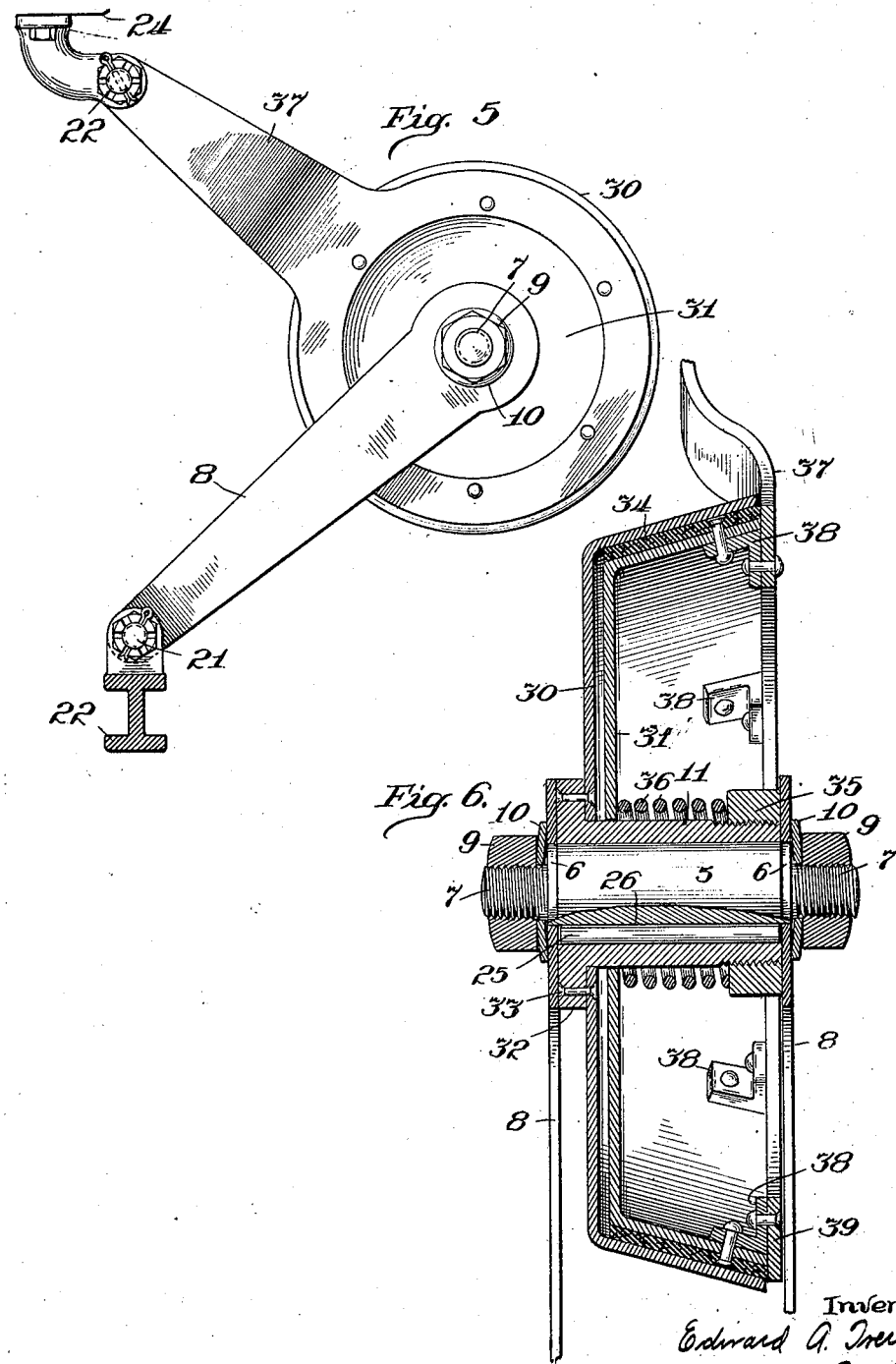

EDWARD A. TVERDAHL, OF CHICAGO, ILLINOIS, ASSIGNOR OF ONE-HALF TO JOSEPH F. DAVIS, OF CHICAGO, ILLINOIS.

REBOUND-CHECK SHOCK-ABSORBER.

1,275,177.   Specification of Letters Patent.   Patented Aug. 6, 1918.

Application filed February 21, 1917. Serial No. 150,314.

*To all whom it may concern:*

Be it known that I, EDWARD A. TVERDAHL, a citizen of the United States, residing at Chicago, in the county of Cook and State of Illinois, have invented certain new and useful Improvements in Rebound-Check Shock-Absorbers, of which the following is a specification.

The object of my invention is the provision of effective means for checking the rebound of vehicle spring which means is certain in operation, simple in construction and therefore inexpensive to manufacture, and embodies no parts liable to be rapidly worn or broken under the severe stresses to which such devices are subjected in service.

A further object of my invention is the provision of means for frictionally retarding the rebound of vehicle springs whereby breakage of the springs is prevented and the vehicle is caused to ride smoothly over the roughest roads and of means for adjusting the retarding means to provide for maximum efficiency thereof.

Further objects and advantages of my invention will be apparent as it is better understood by reference to the following specification when read in connection with the accompanying drawing, illustrating the preferred embodiments thereof, in which—

Figure 1 is a view in perspective of the device showing the mode of applying it to a vehicle;

Fig. 2 is a detail in elevation partially in section of a portion of the device with parts removed for better illustration;

Fig. 3 is a vertical transverse section on through the device;

Fig. 4 is a detail in perspective of the clutch;

Fig. 5 is an elevation of a slightly different form of my invention, and

Fig. 6 is a vertical section through the device as illustrated in Fig. 5.

Referring to the drawing, 5 denotes a short shaft having its ends formed with noncircular reduced extensions 6 and threaded portions 7 to receive a pair of parallel radial arms 8, said arms having their inner ends apertured to fit over the reduced extensions 6. Nuts 9 engaging the threaded portions 7, with locking washers 10 interposed between the nuts and the outer faces of the arms 8, rigidly secure the latter to the shaft 5.

On the shaft 5 is rotatably mounted a hub 11 having intermediate its ends an outstanding peripheral flange 12, and carrying opposite the latter a collar 13 between which flange and collar is clamped a disk 14 having both its sides faced with a suitable friction material 15 secured to the disk by rivets 16 or other suitable fastening means. The disk 14 is fixed between the flange 12 and the collar 13 by bolts or other suitable fasteners 17 passing therethrough.

The parts thus far described constitute one of a pair of relatively movable members, the other of the pair being two parallel radial arms 18 having enlarged inner ends and spaced to receive the parts 14 and 15 therebetween. The enlarged inner ends of the arms 18 are clamped in frictional engagement with the friction material 15 by U-shaped members 19 embracing the edge portions thereof. Screws 28 in each of the members 19 permit the latter to be secured in position. By tightening the screws 28 the enlarged portions of the arms 18 are clamped against the friction material 15 and by adjusting the screws the degree of friction may be varied as desired.

The arms 8 are connected in parallelism by a bolt 21 passing through their outer ends and for the same purpose a bolt 22 is passed through the outer ends of the arms 18. When the device is applied to the vehicle the two sets of arms diverge from the shaft 5. The arms 8 extend outwardly and downwardly and are secured at their outer ends to the axle 23 of the vehicle and the arms 18 extend outwardly and upwardly and are secured at their outer ends to the body 24 of the vehicle. The two sets of arms are, therefore, mounted so that they can swing toward and from each other upon relative movement of the axle and the vehicle body. A clutch mechanism is provided and is constructed and arranged so that there may be a free, unchecked relative movement of the members in one direction while relative movement in the other direction is prevented. This clutch consists of a series of rollers 25 mounted in recesses 26 in the periphery of the shaft 5. The recesses are tapered toward one end and the rollers are urged toward said end by springs 27. Thus upon relative movement of the shaft and the hub 11 in one direction the rollers are jammed against the inside of the hub and the latter is clutched to the shaft so that the shaft and the hub turn as one. Relative movement of the shaft and the hub in the opposite direction frees the rollers 25 and disconnects the hub from the shaft.

The clutch mechanism is so arranged that when the vehicle body 24 moves downward toward the axle 23 the shaft 5 and hub 11 slip and hence the downward swing of the arms 18 is not checked as the arms 18, friction material 15 and the part 14 move bodily with the hub about the shaft. However, when the vehicle body rises on the rebound, the clutch couples the shaft 5 and the hub 11 together and assuming these parts to be stationary relative to the arms 18 it will be seen that the upward swing of said arms as they follow the vehicle body is checked by their frictional engagement of the enlarged inner ends thereof with the parts 15. The springs are permitted to return the vehicle body to its normal position relative to the axle but the action is restrained, thus eliminating the disagreeable jolting experienced in vehicles which are not equipped with shock absorbers.

In Figs. 5 and 6 of the drawing I have illustrated a slightly different form of my invention. The two friction members are indicated at 30 and 31, respectively. The member 30 is fixed on the hub 11, the latter having an outstanding end flange 32 to which said member is bolted or otherwise secured as indicated at 33. The member 31 is slidably mounted on the hub 11 and has a lining 34 of friction material. On the hub 11 is mounted an adjusting nut 35, between which and the outer face of the member 31 is held a spring 36 which is coiled around the hub and which holds the friction surface of the member 30. The tension of the spring is regulated by means of the nut 35 so that the degree of friction between the members 30 and 31 may be adjusted as desired.

A ring 39 is secured to the rim of the member 31 by means of angle pieces 38 and the ring is provided with an extension forming an arm 37 corresponding to the arms 18 in the previously described structure. A clutch embodying a series of rollers 25, mounted in recesses 26 in the periphery of the shaft 5 and urged toward the tapered ends of said recesses by springs 27, is provided as described in connection with Figs. 1 to 4, inclusive, and performs the same function.

The mechanism last described operates in the same manner as the first described mechanism, the only difference being the means whereby the frictional engagement between the two relatively swinging members is obtained.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. A device of the character described comprising a pair of members mounted for relative swinging movement, means frictionally engaging a relatively large circumferentially disposed surface of one of said members, means for automatically locking said first-mentioned means to the other of said members upon relative movement of said members in one direction and for releasing said first-mentioned means upon relative movement of said members in the opposite direction, and means embracing said first-mentioned means and the member in frictional engagement therewith for adjusting the degree of friction therebetween.

2. A device of the character described comprising a shaft, a radial arm extending from the shaft, a hub mounted on the shaft, a friction element carried by the hub, a radial arm extending in an angular direction with respect to the first-mentioned arm, a plurality of clamps embracing the second-mentioned arm and said element, screws carried by said clamps for adjustably securing the latter in operative position, and a clutch connection between the shaft and hub whereby the latter is freely movable in one direction with respect to said shaft.

3. A device of the character described comprising a shaft, a pair of radial arms fixed on the ends of the shaft, a hub on the shaft between said arms, a clutch connection between the hub and shaft, said connection being free to slip in one direction, a disk carried by the hub intermediate its ends and having friction surfaces on both sides, a pair of spaced radial arms having their inner ends in frictional engagement with said friction surfaces, and means for maintaining said frictional engagement.

4. A device of the character described comprising a shaft, a pair of radial arms fixed on the ends of the shaft, a hub on the shaft between said arms, a clutch connection between the hub and shaft, said connection being free to slip in one direction, a disk carried by the hub intermediate its ends and having friction surfaces on both sides, a pair of spaced radial arms having their inner ends in frictional contact with said friction surface, and means embracing said inner ends for maintaining and varying said frictional contact.

5. A device of the character described comprising a pair of members mounted for a relative swinging movement, an element carried by one of the members and having a frictional engagement with the other member, a clutch connection between the first-mentioned member and the element carried thereby, said connection being made upon relative movement of said members in one direction and broken upon relative movement of said members in the opposite direction, and means for varying the friction between said element and the member engaging therewith, comprising a plurality of clamps embracing said element and the member frictionally engaged therewith.

EDWARD A. TVERDAHL.

Witnesses:
WM. O. BELT,
M. A. KIDDIE.